Patented Apr. 28, 1953

2,636,889

UNITED STATES PATENT OFFICE 2,636,889

MODIFIED SOYBEAN LECITHIN

Edwin P. Jones and John C. Cowan, Peoria, Ill., assignors to the United States of America as represented by the Secretary of Agriculture No Drawing. Application July 24, 1951,
Serial No. 238,367

7 Claims. (Cl. 260—403)

(Granted under Title 35, U. S. Code (1952), sec. 266)

The invention herein described may be manufactured and used by or for the Government of the United States of America for governmental purposes throughout the world without the payment to us of any royalty thereon.

This invention relates to novel and useful compositions of matter, specifically modified soybean lecithin products, and to methods for preparing them.

Crude lecithin is produced in quantities in the soybean oil refining industry. In refined form it finds limited use in the food and related fields, but its production in this country has exceeded its utilization. As a result, large quantities of crude soybean lecithin are available at a relatively low cost. Crude lecithin has inherent physical and chemical properties which render it potentially useful as a dispersing assistant, but heretofore, considerable difficulty has been experienced in extending its use. For example, the material can be dispersed in aqueous media only with difficulty. Moreover, dispersions, once obtained, undergo fermentation at ordinary temperatures.

Commercial crude soybean lecithin usually contains from 27–35 percent glyceride oil, and 7–12 percent carbohydrates, as well as the phosphatides. In this specification and claims, the term "crude soybean lecithin," refers to the mixture of glyceride oil, phosphatides and carbohydrates as obtained in the refining of soybean oil, particularly in the degumming operation.

We have discovered that this crude lecithin, or that part of it insoluble in acetone, may be reacted with the class of organic isocyanates to produce a modified lecithin composition possessing distinctive physical and chemical properties. For example, the reaction products may be readily dispersed in water, and the dispersions thus produced are remarkably stable and do not undergo fermentation or develop the rancid odor characteristic of the commercial unmodified lecithin. The products may be waxy or granular, even when made from crude lecithin containing 30–35 percent glyceride oil. Generally, they may be resinous in nature in contrast to the semi-liquid, sticky, or pasty character of unmodified lecithin.

The products of the invention may assume a wide range of physical form, although generally of the character previously described. For example, depending chiefly on the proportion of isocyanate reacted with the commercial lecithin, they vary from soft waxes through hard waxy solids to hard resin-like solids. As the proportion of isocyanate is increased, the hardness of the product generally increases.

According to the invention, crude soybean lecithin is reacted with an organic isocyanate, in the proportion of about from 0.2 mole to 4 moles of isocyanate per mole of soybean lecithin, at a temperature from 50° to 95° C. until the odor of isocyanate disappears thus indicating completion of the reaction.

The isocyanates which we employ may be any organic monoisocyanate or polyisocyanate. Chemical modification by diisocyanates gives products, at corresponding reacting proportions, which are relatively more solid in physical form than the products of the monoisocyanates. In the invention we may employ aromatic isocyanates, such as phenyl isocyanate, alpha- and beta-naphthyl isocyanate, tolyl isocyanate, and the like; substituted isocyanates, such as chlorophenyl or nitrophenyl isocyanate; alkyl or aralkyl isocyanates, such as octadecyl isocyanate, methylene bis phenyl isocyanate, and the like, or we may use diisocyanate, either alkylene or arylene as, for example, tolyl 2,4-diisocyanate, hexamethylene diisocyanate, and the like.

The exact nature of the reaction is not fully known. We have obtained evidence, however, that chemical modification of several of the constituents of the crude mixture occurs during the reaction. This is evident, to some extent, from the physical changes which are enumerated below. As will be explained in the following specification, the proportions of the crude lecithin to isocyanate in accordance with this invention may vary over a considerable range. For the sake of convenience in calculating molal proportions of reactants the molecular weight of crude lecithin is assumed to be 800. In general, increasing the relative proportion of isocyanate causes the following changes within the broad range of 0.2 to 4 molecular equivalents of isocyanate per mole of crude lecithin. The changes are, in general, progressive with the changes occurring gradually as the proportions are increased.

(1) The dispersibility in water increases in the lower range, passes through a maximum range at about 1-2 molecular equivalents of isocyanate per mole of lecithin, and subsequently decreases until the product becoms difficult to disperse in water by hand shaking.

(2) Aqueous dispersions of the product are characterized by decreasing surface tension followed by a subsequent increase up to values approaching that for dispersions of unmodified soybean lecithin.

(3) The solubility of the products in aliphatic solvents, such as hexane, heptane, or petroleum ether progressively decreases.

(4) The acetone solubility, i. e., the products soluble in acetone, progressively increases up to values as high as 95 percent.

The process of our invention can be carried out with remarkable ease. The reaction conditions are simple:

(1) Causing molecular contact between the isocyanate and the lecithin, (2) Controlling the rate and extent of reaction by controlling the time and temperature thereof.

We generally prefer to carry out the reaction in a solvent inert toward isocyanates, such as hexane, benzene, pyridine, and the like, when preparing relatively small amounts of the product. The lecithin is first dissolved in the solvent and the pre-determined amount of isocyanate then added while the requisite temperature is maintained until complete reaction is assured.

The use of an organic solvent is not necessary, however, as we have obtained satisfactory results merely by mixing the lecithin and the organic isocyanates in conventional mixers, such as dough mixers or the like. This latter method is preferred when preparing larger amounts of product. Ordinarily, precautions against contamination with water or moisture should be taken because isocyanates tend to react rapidly with water to form urea derivatives.

The rate of reaction may be controlled by means of the temperature and the reaction time. The reaction proceeds at room temperature, but it is convenient to employ heat to accelerate the reaction and for other reasons which will be apparent from the following disclosure. The completion of reaction may readily be determined by the disappearance of the characteristic isocyanate odor.

When carrying out the reaction in a volatile organic solvent, we prefer to maintain the mixture at the reflux temperature for a period of from 2 to 7 hours. This is chiefly dictated by convenience, and assures complete reaction of many of the isocyanates with the crude lecithin.

When no solvent is used, the reaction may be conducted in a mechanical mixer provided with a means for keeping the reaction mixture at 50°-95° C. As previously stated, the reaction is considered to be complete upon the disappearance of isocyanate odor. However, we usually employ reaction times of about 1 hour to assure complete reaction. It is well to select a reaction temperature in excess of 50° C. to facilitate release of carbon dioxide which is usually formed from the residual water present in the lecithin upon reaction with isocyanates. Otherwise, this unreleased gas will cause the mixture to overflow the mixing chamber.

For reasons of economy and convenience, we prefer to employ monoisocyanates in our invention. Moreover, the products modified with monoisocyanates manifest relatively greater degrees of improvement upon modification. It is to be understood, however, that the use of polyisocyanates is within the purview of this invention. For example, although possessing slightly less applicability to problems involving surface activities of dispersions, the diisocyanate products represent distinctly modified compositions of material inherently useful in the resin arts.

The following specific examples illustrate the invention.

Approximately 7 grams of crude soybean lecithin, containing approximately 30 percent soybean oil and 10 percent carbohydrates, was dissolved in dry benzene in each of the experiments tabulated below. After cooling to room temperature, designated amounts of each isocyanate were added to each of 4 reaction flasks and the contents kept at reflux for about 7 hours. For calculation purposes, the crude lecithin was assumed to have a molecular weight of 800. The reaction mixture was allowed to stand overnight, after which the solvent was removed until constant weight was obtained.

After establishing the product weight, percentage recovery was calculated on the total weight of the two ingredients. Subsequently, the water dispersibility was determined at 1 percent concentration. Surface tension measurements by the drop weight method were conducted on the aqueous dispersions after filtration through absorbent cotton. All products listed as "completely dispersed" or "partially dispersed" showed surface tensions appreciably less than water.

Observations were made on the alteration in physical character of the products as a function of the amount of isocyanate used. A product which would gradually flow was termed a "thick" liquid. Progressively more solid products were termed "pasty," "waxy" or a "brittle solid." The data are shown in the following table.

TABLE I

| Example No. | Isocyanate | Mol. Ratio | Recovery, Percent | Properties of Product | | | |
|---|---|---|---|---|---|---|---|
| | | | | Physical Form | Water Dispersibility | Surface Tension | Percent Acetone Solubility |
| 1 | Toluene 2-4 Diisocyanate | 0.2 | 99 | Waxy solid | Complete | 48 | 26 |
| | | 0.4 | 99 | ↓ | do | 45 | 24 |
| | | 0.6 | 99 | Resinous solid | Incomplete | 50 | 23 |
| | | 0.8 | 99 | | do | 58 | 21 |
| 2 | Hexamethylene Diisocyanate | 0.5 | 99 | Resinous fluffy solid for all | Complete | 51 | 24 |
| | | 1.1 | 98 | | Incomplete | 50 | 23 |
| | | 1.6 | 98 | | do | 47 | 24 |
| | | 2.1 | 97 | | do | 63 | 23 |
| 3 | Octadecyl Isocyanate | 0.2 | 100 | | Incomplete | 59 | 25 |
| | | 0.4 | 100 | | do | 52 | 26 |
| | | 0.6 | 94 | All were like thick paste | do | 62 | 27 |
| | | 0.8 | 97 | | do | 72 | 27 |
| | | 1.5 | 98 | | do | | 24 |
| | | 2.5 | 97 | | do | | 31 |
| | | 3.6 | 96 | | do | | 34 |

TABLE I—Continued

| Example No. | Isocyanate | Mol. Ratio | Recovery, Percent | Properties of Product | | | |
|---|---|---|---|---|---|---|---|
| | | | | Physical Form | Water Dispersibility | Surface Tension | Percent Acetone Solubility |
| 4 | Meta Chloro Phenylisocyanate | 1.0 | 101 | Waxy | Complete | 41 | 54 |
| | | 1.5 | 102 | ↓ | ....do | 54 | 72 |
| | | 2.0 | 103 | Hard wax | Incomplete | 64 | 84 |
| | | 2.5 | 101 | | Indispersible | 72 | 89 |
| 5 | Meta Tolyl Isocyanate | 1.0 | 98 | Thick liquid | Complete | 44 | 45 |
| | | 1.5 | 99 | ↓ | Incomplete | 42 | 63 |
| | | 2.0 | 98 | Soft wax | Indispersible | 58 | 75 |
| | | 2.5 | 86 | | ....do | 55 | 79 |
| 6 | Para Nitro Phenyl Isocyanate | 0.5 | 99 | Wax | Complete | 48 | 41 |
| | | 1.0 | 99 | ↓ | ....do | 42 | 70 |
| | | 1.5 | 99 | Resinous solid | Incomplete | 50 | 83 |
| | | 2.0 | 99 | | ....do | 50 | 98 |
| 7 | Phenyl Isocyanate | 1.0 | 99 | Pasty | Complete | 50 | 42 |
| | | 1.5 | 99 | Soft wax | ....do | 38 | 61 |
| | | 2.0 | 98 | ....do | Incomplete | 40 | 73 |
| | | 2.5 | 97 | Hard wax | ....do | 67 | 84 |
| 8 | Alpha Naphthyl Isocyanate | 0.5 | 99 | Thick liquid | Complete | 48 | 32 |
| | | 1.0 | 99 | Soft wax | ....do | 43 | 46 |
| | | 1.5 | 98 | Wax | Partial | 45 | 57 |
| | | 2.0 | 99 | Hard wax | Incomplete | 54 | 69 |
| 9 | Beta Naphthyl Isocyanate | 0.5 | 106 | Pasty | Complete | 55 | 27 |
| | | 1.0 | 98 | Wax | ....do | 53 | 31 |
| | | 1.5 | 96 | Friable solid | Partial | 49 | 35 |
| | | 2.0 | 97 | Brittle solid | Incomplete | 41 | 46 |

Example 10

Crude soybean lecithin (353 g.) containing about 30 percent soybean oil was placed in a steam jacketed dough mixer heated to about 60°–65° C. Phenyl isocyanate (70.6 g.) was added dropwise and the temperature raised gradually to about 70°–75° C. At the end of twenty minutes of mixing, there was no residual odor of phenyl isocyanate in the reactor. Samples were taken at this time for evaluation of physical properties and to evaluate various methods of product handling. The mixing was continued for about four hours, the temperature being gradually raised to a final temperature of 80°–85° C. The reaction was then stopped and further samples taken for physical characteristics and product handling evaluation. To the remainder of the product in the reactor, sufficient water was added to render the material fluid enough to be poured out.

The product handling studies for both sets of samples were as follows. The results were practically identical for both sets of samples.

(1) A mass of the still warm product was held up and allowed to fall in a thin stream which hardened upon cooling to hard wax-like string.

(2) A mass of the product was subjected to vacuum at room temperature. The product was a light, porous, semi-friable solid.

(3) A mass of the product was spread on a flat surface and subjected to vacuum at about 80° C. The product was a dense, hard, wax-like sheet, easily broken with the fingers.

The procedure of the foregoing example was repeated, employing instead 15 parts of phenyl isocyanate per 100 parts of the crude lecithin. The surface tension values for both runs, calculated as in the preceding examples, are tabulated below.

TABLE II
Surface tension, dynes per cm.

| Mol. Proportion Isocyanate/lecithin | Reaction time | |
|---|---|---|
| | 20 minutes | 4.5 hours |
| 1.3 | 52 | 46 |
| 1.0 | 47 | 49 |
| Control | 63 | |

We claim:

1. The method comprising reacting soybean lecithin containing about 27 to 35 percent glyceride oil and about 7 to 12 percent carbohydrates with one of the group consisting of aromatic and aliphatic isocyanates at temperatures in excess of 50° C. for a period of time at least until the odor of isocyanate disappears, the reacting proportions being from 0.2 mole to 4 moles of isocyanate per mole of soybean lecithin.

2. Method of claim 1 in which the reaction is carried out in an organic medium inert to isocyanates.

3. Method of claim 1 in which the organic isocyanate is an aromatic monoisocyanate.

4. Method of claim 1 in which the isocyanate is a diisocyanate.

5. Method of claim 1 in which the isocyanate is an aliphatic isocyanate.

6. Product produced by the method of claim 1, being characterized by dispersibility in water and increased resistance to attack by microorganisms.

7. The method comprising reacting soybean lecithin containing about 27 to 35 percent glyceride oil and about 7 to 12 percent carbohydrates with phenyl isocyanate at a temperature of 60°–75° C. for a period of time until the odor of phenyl isocyanate disappears from the reactor, the reacting proportions being 1–2 molecular equivalents of isocyanate per mole of soybean lecithin and recovering the reaction product by cooling and comminuting the cooled product.

EDWIN P. JONES.
JOHN C. COWAN.

No references cited.